United States Patent [19]

Pupalaikis

[11] Patent Number: 5,754,452
[45] Date of Patent: May 19, 1998

[54] METHOD AND APPARATUS FOR INCREASING UPDATE RATES IN MEASUREMENT INSTRUMENTS

[76] Inventor: Peter J. Pupalaikis, 13 Kathryn Dr., Whippany, N.J. 07981

[21] Appl. No.: 681,720

[22] Filed: Jul. 29, 1996

[51] Int. Cl.[6] .................................................. G06F 15/20
[52] U.S. Cl. .................... 364/571.02; 364/571.01; 364/554; 364/573; 364/138; 395/900; 395/906; 395/914; 395/3; 395/11
[58] Field of Search .................... 364/571.02, 139, 364/221.9, 164, 571.01, 554, 573, 138; 395/906, 11, 12, 22, 914, 900, 61, 3; 73/4 R, 1 E

[56] References Cited

U.S. PATENT DOCUMENTS

| | | | |
|---|---|---|---|
| 4,990,784 | 2/1991 | Dukes et al. | 250/358.1 |
| 5,269,311 | 12/1993 | Kirchner et al. | 128/672 |
| 5,369,603 | 11/1994 | Myers | 364/571.02 |
| 5,549,650 | 8/1996 | Bornzin et al. | 607/24 |
| 5,570,304 | 10/1996 | Mark et al. | 364/571.03 |

OTHER PUBLICATIONS

Edwin J. Purcell, Calculus with analytic geometry, pp. 688–695, 1965.

*Primary Examiner*—James P. Trammell
*Assistant Examiner*—Hien Vo
*Attorney, Agent, or Firm*—Robert B. Leonard; Anthony Miologos

[57] ABSTRACT

A method of processing readings in a measurement instrument is provided to allow for faster updates when dealing with very complex characterization equations. The present method calculates the exact and precise process variable utilizing these complex equations somewhat infrequently, while providing the ability to perform updates using a less complicated characterization equation estimation according to Taylor's theorem. By accomplishing faster update rates, the measurement instrument provides a process control system with the necessary speed and performance to accomplish tighter control.

16 Claims, 5 Drawing Sheets

Fig. 5

METHOD AND APPARATUS FOR INCREASING UPDATE RATES IN MEASUREMENT INSTRUMENTS

BACKGROUND OF THE INVENTION

The present invention relates generally to the control and operation of measurement instruments. More specifically, the invention provides an effective apparatus and method for increasing the update rates in measurement instruments. Further, the present invention provides a method to increase the update rate in an industrial measurement instruments used in control applications.

In many control systems, numerous measurement instruments are required to control a device or process. Specifically, the measurement instruments are used to monitor various process variables (i.e. various parameters of operation such as pressure, temperature, etc.). For example, in the control of a manufacturing process involving chemicals or fluids, many measurement instruments (e.g. pressure sensors, temperature sensors, and flow sensors) are used to control the overall process. Depending upon the particular application, these measurement instruments may be located in many different places. It is very common for these measurement instruments to be located throughout the factory or plant to control different aspects of its operation. In this situation, the measurement instrument is typically a large distance from the central control system or control computer.

Alternatively, the measurement instrument and the control system may be a small self-contained unit that is controlling one small process or apparatus. For example, flow sensors may be placed very close to a valve. The control system may then be used for simply controlling the fluid flow through this valve, adjusting the valve opening appropriately to achieve the desired flow rate.

Regardless of the positioning of the measurement instrument in relation to the control system, it is becoming increasingly popular for each measurement instrument to have dedicated electronics included within the same housing (thus the measurement instrument includes a sensor and processing electronics). Such a configuration has numerous advantages. Many sensors typically have an analog output. By immediately processing this analog output (e.g. converting it to a digital output), noise is eliminated and the accuracy of the measurement instrument is increased. Furthermore, all processing can be done within a single measurement instrument to produce a very accurate and robust output. Also, when configured in this manner, measurement instrument (again, the sensor itself and designated electronics) can be easily removed and replaced without having to re-calibrate the entire control system.

In summary, it is extremely advantageous to utilize measurement instruments which include their own dedicated electronics. By using this configuration, numerous advantages are created, especially when used in a larger control system.

As is well known by those skilled in the art of control systems, the use of closed loop systems is the most advantageous and effective way to control devices or processes. In a closed loop control system, it is essential that each portion of this system have sufficient accuracy and speed. The accuracy of a control system is limited by the accuracy of its sensing elements. Also, the control systems ability to control an apparatus or process is dependent upon the speed with which each of its elements respond. If all elements perform their assigned task very quickly, control is easily achieved in a very quick manner. For example, if a measurement instrument can respond quickly to changes in the sensed condition, this will allow the control system to be tuned such that it will quickly adjust its controlling mechanisms to maintain the desired levels of operation. This ability to respond is governed by stability criteria which is limited by the frequency response of the controller, system being controlled and sensor elements. A stable control system which responds quickly and provides precise control is commonly referred to as a "tight" control system.

Many types of control systems are presently used to control a wide variety of processes or devices—all displaying the above mentioned characteristics. Examples of such control systems include chemical refining processes, flow control systems, temperature control systems, pressure control systems, manufacturing process control systems, vehicle control systems, etc.

Sensors used in measurement instruments typically include many inherent problems or complications. These problems may include non-linearities, temperature sensitivity, unit to unit variations, various bias levels, and varying scale factors. All of these factors affect the accuracy of the sensor. To compensate for each of these factors, the dedicated electronics typically perform mathematical corrections to eliminate the inaccuracies caused and produce the desired measured value or process variable. These corrections may be accomplished through the use of analog circuits or digital processors, however the latter is much more versatile and effective.

In operation, the dedicated electronics will typically receive a signal from the sensor and perform many different operations. It is often necessary to first convert the signal to a digital signal as many sensors themselves produce analog outputs. Filtering to eliminate noise or undesired portions of the sensor signal may also be done. Next, the dedicated electronics will typically correct for all of the above mentioned sensor problems (i.e. non-linearity, bias, scale factor, temperature sensitivity, etc.). Lastly, the dedicated electronics will typically convert the signal to a desired output. This may require processing to determine some value not directly measured by the sensor (such as inferred flow rate, etc.). The steps carried out to correct for inherent sensor problems and to provide the desired output commonly make use of a process variable function or characterization function (i.e. a single function which relates all sensor inputs to the desired process variable).

As can be seen, the above mentioned sequence of events is very involved and typically very complex. For example, it is not uncommon for the process variable function to be an equation which is dependent upon four or five different variables. Further, this function may take on the form of a very complex involved function (e.g. a high order polynomial in multiple variables). As would be expected, dealing with such a complex function requires a very involved calculation which is extremely time consuming for the sensor electronics.

As previously mentioned, when utilized in a closed loop control system, response speed is critical. Therefore, the time required to perform all of the above mentioned calculations is very important. It is undesirable to have slow responding measurement instruments as this lowers the amount of gain allowed in feed back elements which consequently limits the effectiveness of control. Therefore, it is very desirable to have measurement instruments with a fast response speed. The most important aspect of an instrument's speed of response is the instrument update rate. (The instrument update rate is the frequency at which the measurement instrument output is produced or updated.)

Many specific application constraints will affect the update rate. For example, power consumption is often a constraint for the system. In some situations the measurement instrument is placed in a very dangerous or explosive environment. More specifically, the sensor could possibly be a pressure sensor placed on fuel oil tanks in a manufacturing or refining process. In this environment, it is very undesirable to have large amounts of power (electrical power) operating in close proximity to this explosive material.

Power consumption is also a concern in self-contained control systems operating on some type of auxiliary or limited power supply. In this situation, it is necessary to minimize the amount of power drawn by the measurement instrument itself.

These power constraints limit the ability of the sensor electronics to perform their necessary functions. For example, the number of instructions which a processor can execute in a given time is governed by the power available. This is one situation wherein it is necessary to utilize other methods of increasing speed.

In summary, measurement instruments used in control applications often have many inherent limitations which must be dealt with. These problems are typically dealt with through processing and mathematical corrections. While effective, this method often requires the use of very complex and very involved calculations. These complex calculations often have the effect of compromising the performance (specifically the speed) of the control system. This compromising of performance is largely due to power limitations of the measurement instrument. These power limitations effect the processor instruction execution rate which limits the calculation speed (or update rate). Therefore, it is desired to utilize methods which will increase the measurement instrument update rate while still staying within the accuracy and power consumption requirements of the sensor. The ultimate desired result of these faster updates is a more effective and more efficient control loop or control system.

SUMMARY OF THE INVENTION

The present invention provides a measurement instrument with increased update rates. The update rates are increased without effecting the accuracy of the system under static conditions or requiring any additional processing power.

To increase update rates, the measurement instrument of the present invention performs complete updates (complete calculations using the above mentioned process variable functions) somewhat infrequently and calculates a close approximation at a more frequent rate. By producing updates in this manner, the system of the present invention achieves faster updates without affecting the static accuracy of the system.

Taylor's theorem states that all functions can be expressed as an infinite series (so long as the function is infinitely differentiable). A closer examination of Taylor's theorem reveals that use of only the first two terms in a Taylor-series produces a very close approximation of the function's value. This is particularly true when the actual variables are not changing very quickly and the function's second derivative is small. Alternatively stated, the first two terms of a Taylor series are a very close approximation of a functions value, especially when that function's second derivative is small. The present invention makes use of this approximation to increase the update rate of a measurement instrument.

In order to operate the method of the present invention, the process variable function is first stored in the dedicated sensor electronics. Of course, this is naturally done for the measurement instrument to be usable. Additionally, the dedicated electronics will determine the derivative of the characterizing function. These two values are then utilized to produce intermediate approximations of the desired process variable.

In operation, the present invention will perform complete calculations to determine the process variable somewhat infrequently. This detailed process variable update frequency is typically much lower than the desired update rate. To increase the process variable update rate, the above-mentioned approximation is utilized to produce numerous intermediate process variable approximations. By this method, the overall update rate for the process variable is increased while the amount of processor power necessary to accomplish this task remains at a desired level. For example, if it was desired to produce an update rate of approximately 2 Hertz but the fastest the system could update is 1 Hertz (if complete calculations were performed), the method of the present invention could be utilized to achieve this 2 hertz update rate requirement. In achieving this update rate, the system may calculate the specific value of a function and its derivative once every five seconds, while simultaneously producing approximations at one-half second intervals between each detailed calculation. This can be done in a multi-tasking environment in which the processor switches between tasks giving the illusion of doing multiple tasks simultaneously but at a slower rate. Therefore, the desired update rate of 2 hertz (twice every second) could be achieved.

By using this update methodology, the present invention achieves the update rates while still operating within all specified power and accuracy constraints.

It will be recognized of course that this increase in update rates is achieved at the expense of dynamic accuracy. However, the error created is very minimal at most times and is zero under static conditions.

It is an object of the present invention to provide a measurement instrument with desirable update rates which can be used in a very tight control system. It is a further object of the invention to achieve these increased update rates without increasing the necessary processor power requirements. It is a further object of the present invention to produce a processing method for use by measurement instruments which will achieve required update rates.

It is a further object of the present invention to create measurement instruments for use in a robust and tight control system.

It is an additional object of the present invention to produce a measurement instrument which is very accurate in static conditions while it also provides a higher speed update rate.

It is another object of the present invention to produce a measurement instrument for use in a controlled system which will allow the control system to quickly respond to changes in the process variable.

DETAILED DESCRIPTION OF THE DRAWINGS

Further objects and advantages of the present invention may be seen by reading the following detailed description in conjunction with the drawings in which.

DETAILED DESCRIPTION OF THE PREFERRED EMBODIMENT

Figure 1:
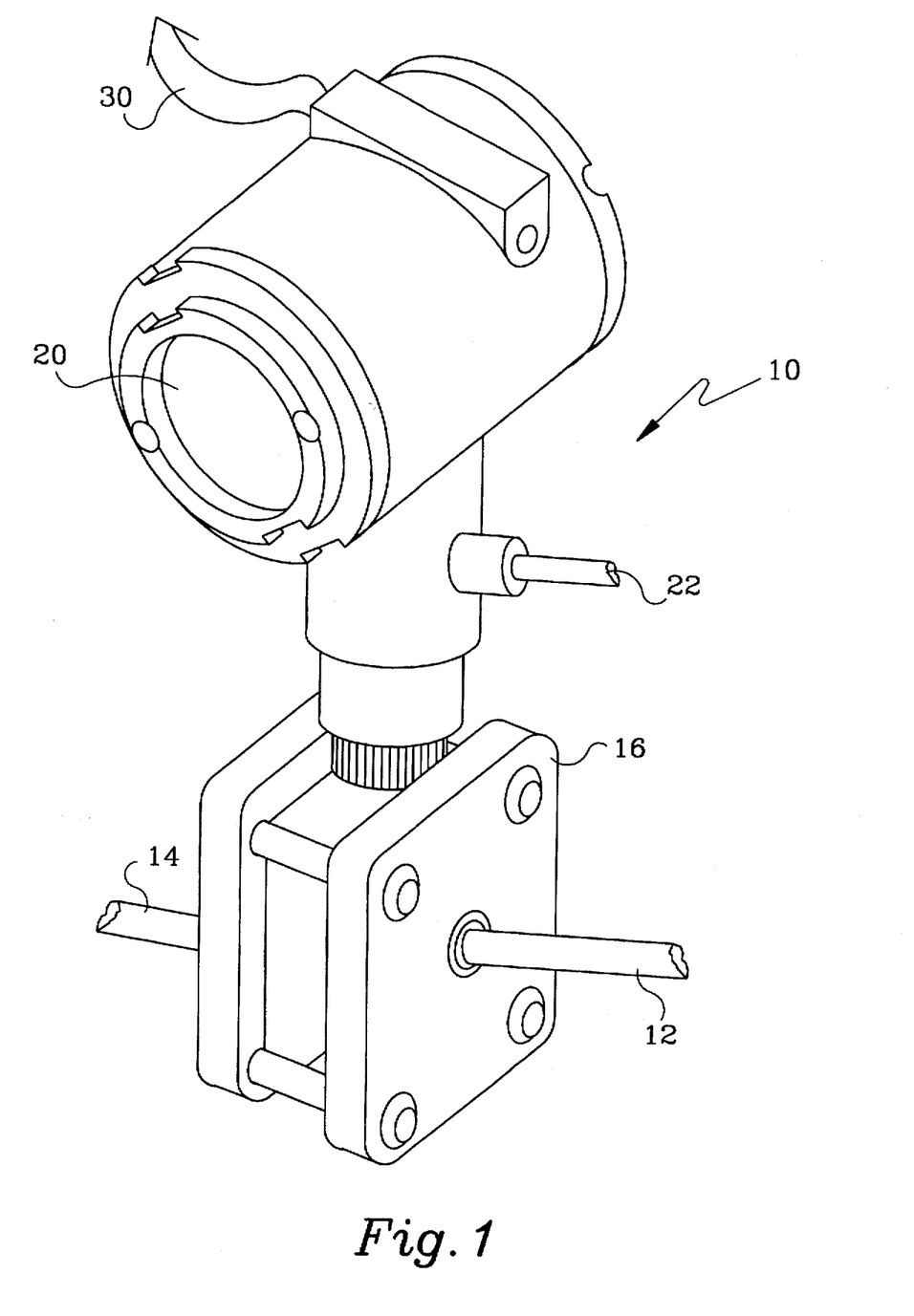
FIG. 1 is a prospective view of a pressure sensor utilizing the update method of the present invention.

Referring now to FIG. 1, there is shown a measurement instrument 10 which utilizes the concept of the present invention. More specifically, the measurement instrument 10 shown in FIG. 1 is a pressure transmitter for measuring differential pressures and producing a signal indicative thereof. The details of the present invention will be described in the context of this pressure transmitter 10; however, the concepts of the present invention are equally applicable to numerous other measurement instruments.

As is understood by those skilled in the art, pressure transmitter 10 is utilized for measuring differential pressure levels between two points in a manufacturing process. For example, pressure transmitter 10 could be positioned such that a first input 12 is positioned on one side of an orifice while a second input 14 is positioned on an opposite side of an orifice. Depending on the configuration of the orifice, this pressure differential will indicate pressure drops across the orifice and can be indicative of flow rates through the pipe section.

To accomplish the above mentioned function, pressure transmitter 10 has a sensor housing 16 located between first pressure inlet 12 and second pressure inlet 14. Within sensor housing 16 is a process variable sensor for producing signal indicative of the process variable being measured. In this example the process variable sensor is a differential pressure signal (e.g. a diaphragm-type differential pressure sensor). Generally speaking, the sensor is exposed to a fluid at first pressure inlet 12, and is also exposed to a fluid at second pressure input 14. The sensor then produces a pressure signal which is indicative of the differential pressure between these two inputs.

The differential pressure signal from the sensor is then transmitted from sensor housing 16 to processing electronics 18 within a processor housing 20. Processing electronics 18 typically includes electronics to provide correction or conditioning to the differential pressure signal (using the aforementioned process variable function). Typically this includes a processor and/or analog circuitry which will adjust for peculiarities in the sensor output. For example, it is well known that many devices are nonlinear; therefore, their output must be adjusted accordingly to determine a useable pressure signal. Furthermore, the sensor is typically temperature sensitive and this temperature sensitivity must be corrected for. Many other peculiarities may exist in the pressure sensor which are conveniently corrected through mathematical corrections. Typically, processor housing 20 also has a number of other inputs such as a temperature sensor input 22 which will provide additional information to assist the processor in carrying out its function.

After processor and/or processing electronics 18 have carried out all calculations, corrections and adjustments necessary, the transmitter produces a process variable signal at a process variable output 30. In this case, process variable output 30 is a signal indicative of the differential pressure sensed by pressure transmitter 10.

As is well understood, and should be apparent, the above mentioned principles are equally applicable to all types of measurement instruments. Generally speaking, each measurement instrument has a sensor or sensors and a processing system or processor of some type which perform conditioning and/or corrections.

Figure 2:
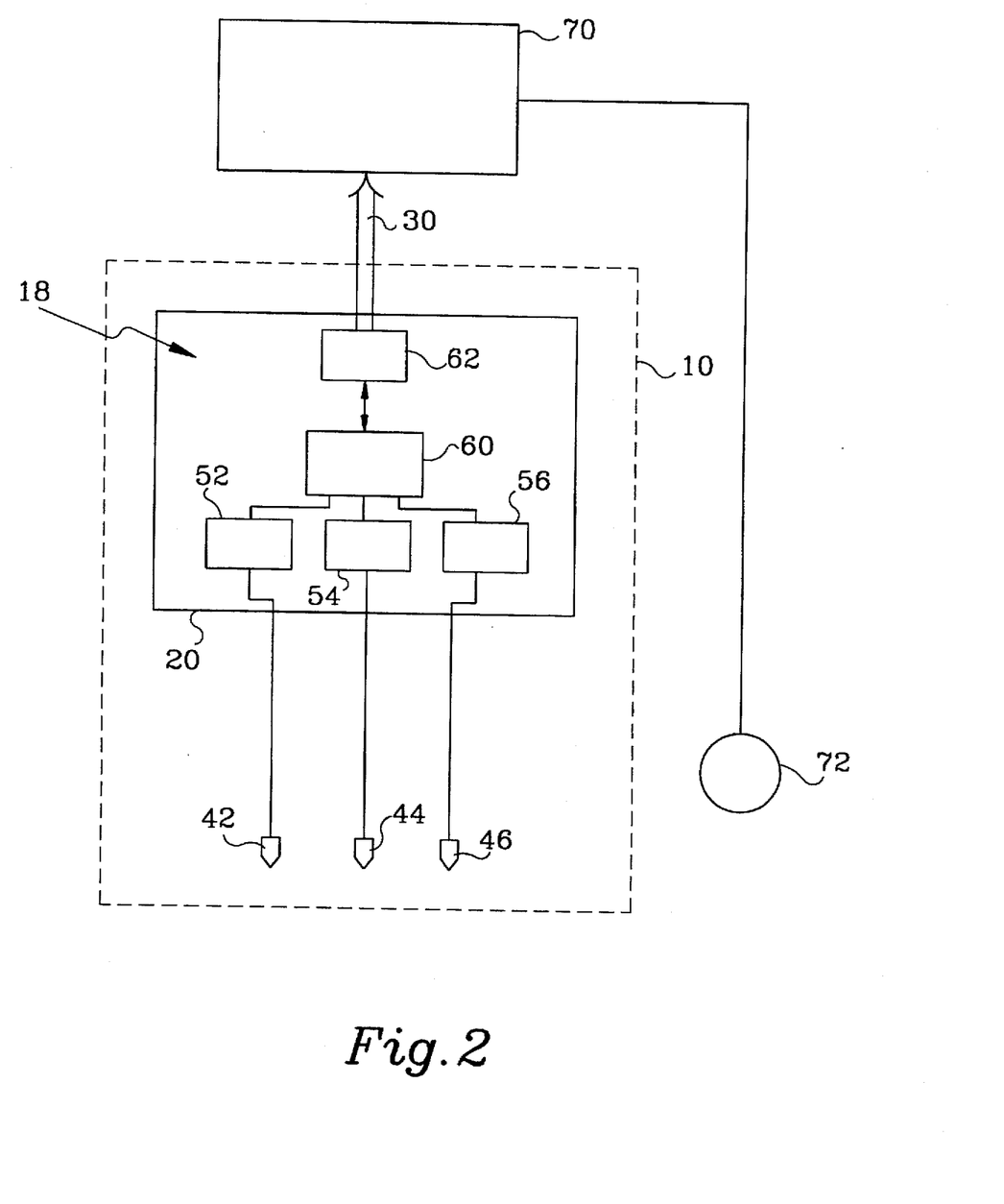
FIG. 2 is a block diagram illustrating the concepts of the present invention as utilized by a closed loop control system.

Referring now to FIG. 2, there is shown one application of a measuring instrument 10 of the present invention. As previously discussed, measurement instrument 10 is utilized as one portion of a process control system. Shown in FIG. 2 is a block diagram illustrating the application of the measurement instrument of the present invention. Measurement instrument 10 includes processor housing 20, a first sensor 42, a second sensor 44, and a third sensor 46. Each of these sensors may be utilized to sense a separate quantity or parameter which will contribute to the calculation of the desired process variable.

In one example application using measurement instrument 10, first sensor 42 may be a temperature sensor, second sensor 44 may be a differential pressure sensor, and third sensor 46 may be a static pressure sensor. These sensors collectively could be used for detection of flow through a pipe. A temperature sensor could be placed on or near an orifice along with pressure sensor 44. Static pressure sensor 46 may be used in conjunction with differential pressure sensor 44 to detect flow. First sensor 42 will detect the temperature of the measurement instrument 10, and both second sensor 44 and third sensor 46 will sense the pressure. All of these devices will provide signals to processor housing 20 indicative of the respective quantities.

Processing electronics 18 have the aforementioned process variable function or equation stored therein which are utilized to correct and adjust the sensor output for inherent inaccuracies. As previously mentioned, pressure sensor 44 may have a nonlinear transfer function wherefore the output of the sensor will not be linearly proportional to the input. Also, pressure sensor 44 may be temperature sensitive such that its output is affected by the temperature thereof.

In the preferred embodiment, processing electronics 18 includes a processor 60 for controlling and calculating and carrying out miscellaneous functions. Further, within processor housing 20 is a first converter 52 attached to first sensor 42. Similarly, a second converter 54 is attached to second sensor 44 and a third converter 56 is attached to third sensor 46. As the respective sensor signal is typically an analog signal, it is advantageous to convert this signal to digital form. First converter 52, second converter 54 and third converter 56 take the form of analog to digital converters which are capable of producing a digital signal indicative of the analog signal received directly from the respective sensor (first sensor 42, second sensor 44 and third sensor 46). The output of each of these converters is then fed into processor 60. Processor 60 takes the form of a general purpose processor which is capable of performing numerous calculations applicable to the measurement unit. More specifically, processor 60 is capable of calculating the desired process variable based upon the respective inputs received. All calculations are then communicated to an input/output device 62 for communication to other devices (such as master control systems).

Measurement instrument 10 has an output 30 for transmitting these calculated process variables to additional devices. Process variable output 30 could take on many forms including a communication bus or a few communication wires. In the preferred embodiment, process variable output 30 is capable of transmitting the process variable signal to a desired device and is also capable of receiving control signals from other devices. As shown in FIG. 2, measurement instrument 10 is attached to a process control system 70. Process control system 70 may take the form of a single controller or might take the form of a very complex control system. Generally speaking, this process control system 70 communicates with one or more measurement instruments and, based upon the signals received from measurement instrument 10, will output a signal to control specific devices to maintain certain control levels.

In FIG. 2, process control system 70 is attached to a control device 72 which is capable of controlling or adjusting some condition based upon signals received from process control system 70. One example of control device 72 is a fluid valve which can be adjusted to regulate the flow of fluid therethrough. Assuming the device described in FIG. 2 is utilized to control the flow of fluid through a valve, a closed loop control system is thereby created. Generally speaking, the sensors 42, 44 and 46 sense the appropriate condition surrounding the valve and transmit signals indicative of these conditions to processing electronics 18. Processing electronics 18 process each of the signals and produce a process variable signal (in this example, a differential pressure signal across a valve) and communicate this signal to process control system 70. Process control system 70 can then determine if this flow condition is within appropriate boundaries and adjust control device 72 appropriately. For example, if the flow rate is too low, control device 72 (a fluid valve) can be adjusted to increase the flow level passing therethrough.

Having described the parts making up measurement instrument 10 of the present invention and also describing one example of its application, the following observations are necessary regarding this instrument. Generally speaking, measurement instrument 10 is located away from process control system 70. Therefore, communication via process variable output 30 may cover large distances (it is much easier to transmit digital signals over long distances than it is to transmit analog signals over these same distances). Also, in some applications, measurement instrument 10 is placed in very hazardous locations. For example, in the processing of dangerous materials (such as explosives or flammable materials), it is impossible to transmit large amounts of energy to measurement instrument 10 without risking explosion of a volatile atmosphere. Therefore, these instruments are constrained by the amount of power they can use and the signal levels which can be transmitted. When used in a highly explosive or dangerous environment, the constraints on power consumption limit the performance of the device. For example, due to these power constraints, a high speed, high-powered processor cannot be used in the measurement instrument of the present invention. Therefore the desired high speed update rates and high accuracy are difficult to achieve.

As previously mentioned, processing electronics 18 and specifically processor 60, generally contains process variable equations relating the sensor readings to the desired process variable. It is recognized by those skilled in the art, however, that these process variable equations are generally very complex. For example, to calculate the actual process variable may require solving a high order, complex polynomial and can be dependent on three or four different variables. Due to the complexity of this equation, calculating the process variable can be very time consuming.

When measurement instrument 10 of the present invention is utilized in a control system, the response speed of the measurement instrument itself will control the performance and response capability of the control system. Therefore, to produce a "tight" or very responsive control system, it is necessary to have fast response by each element within the control loop. Consequently, it is desirable to utilize whatever mechanisms necessary to provide fast updates or a fast response for measurement instrument 10.

The present invention utilizes an efficient approximation method to provide high speed updates of a process variable. As previously mentioned, the process variable is calculated utilizing a process variable function. Again, this function is typically very complex and detailed. However, Taylor's theorem says that a function can be represented as an infinite series (so long as the function is infinitely differentiable). Therefore, the process variable function can be represented:

$$f(x) = f(x_0) + (x - x_0) \cdot \frac{d}{dx} f(x)_{x=x_0} + \frac{(x-x_0)^2}{2!} \cdot \frac{d^2}{dx^2} f(x)_{x=x_0} + \frac{(x-x_0)^3}{3!} \cdot \frac{d^3}{dx^3} f(x)_{x=x_0} + \ldots \quad (1)$$

Using this infinite series, if the value of the process variable function f(x) is known at an initial point ($x_0$), then a reasonable approximation of the sensor at a second input ($x_1$) is:

$$f(x_1) \cong f(x_0) + (x_1 - x_0) \cdot \frac{d}{dx} f(x)_{x=x_0} \quad (2)$$

The present invention increases update rates by calculating the actual process variable infrequently utilizing the detailed characterization function (f(x)), while providing frequent updates utilizing the above mentioned approximation (equation 2). Utilizing this approximation, updates can be quickly obtained utilizing less processor power than is required to calculate the entire process variable function. Therefore if f ($x_0$) and $$\frac{d}{dx} f(x)_{x=x_0}$$

is calculated infrequently (say once every ten sensor readings), high speed update approximations can be calculated quickly using equation 2.

Figure 3:
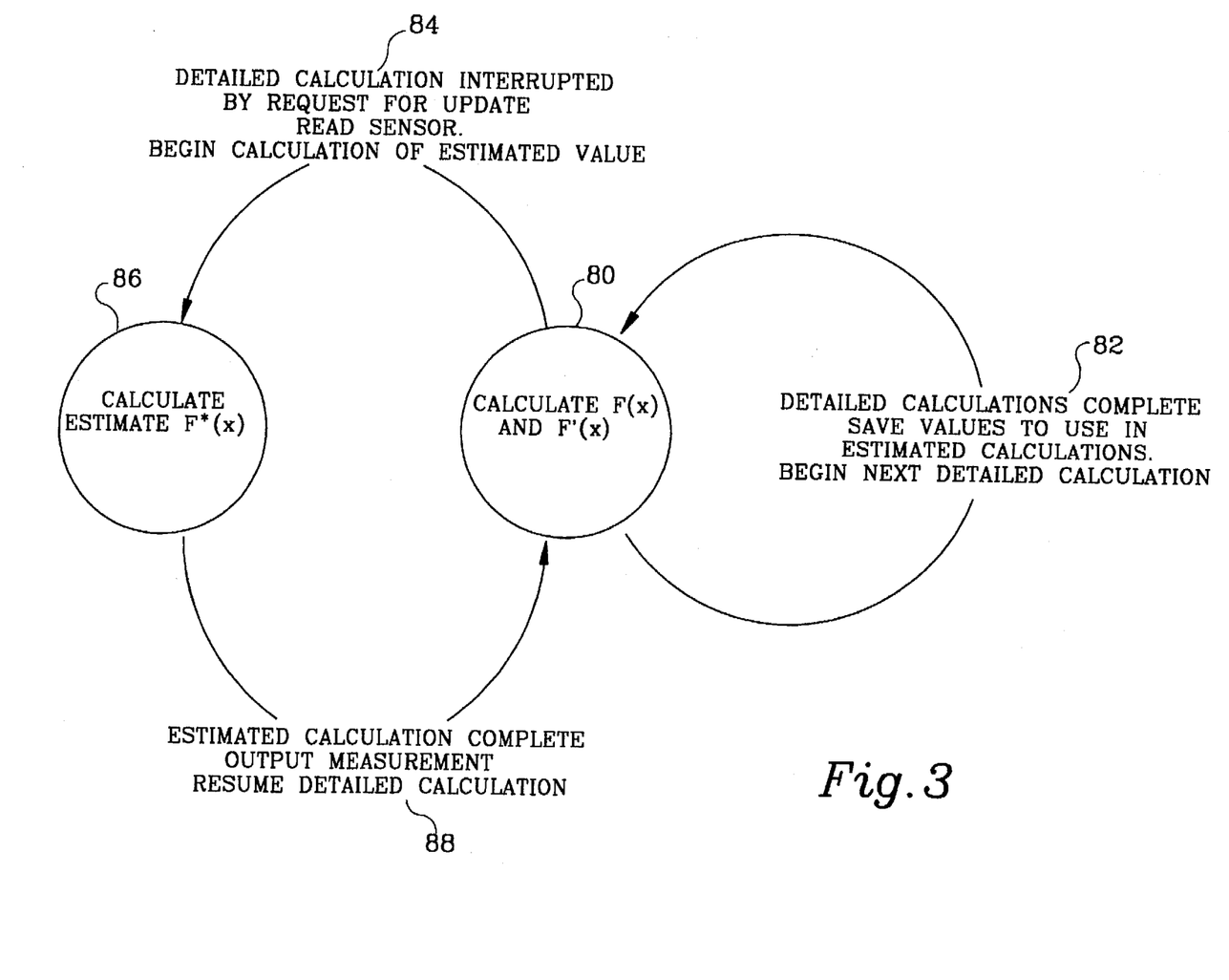
FIG. 3 is a state diagram illustrating the update method utilized to achieve higher update rates.

Referring now to FIG. 3 there is shown a state diagram illustrating the process of the present invention. As previously indicated, the actual process of the present invention is typically carried out by processor 60 within measurement instrument 10. Initially, it should be understood that processor 60 will operate in the most efficient manner capable. This operation will include multi-tasking in which multiple computations can occur simultaneously. Referring again to FIG. 3, the measurement instrument 10 will typically be at calculation state 80 in which the value of the process variable function (f(x)) is calculated for certain variable values and the value of the process variable differential $$\left( \frac{d}{dx} f(x) \right)$$

is also calculated. Again, this is a time consuming and involved process. Once the value of the process variable function (f(x)) is determined and the value of the function differential $$\left( \frac{d}{dx} f(x) \right)$$

is determined at an initial variable value ($x_0$) these two values will be stored for future use.

Following the calculations of these values, the system immediately begins to recalculate the next process variable function values. This involves determining a new variable value (or values) ($x_1$) and calculating the desired function values ($f(x_1)$) and $$\frac{d}{dx} f(x_1)).$$

This process is continually repeated so that the value of process variable function (f(x)) at the most recent variable value (x) is continuously being calculated. Likewise the value of the process variable functions derivative $$\left( \frac{d}{dx} f(x) \right)$$

is also continuously being calculated. This is shown in FIG. 3 as calculation loop 82.

When it is necessary to produce a process variable update, the system will be interrupted to begin the calculation of an estimated value. Referring to FIG. 3, this is shown as estimate state 86 in the State Diagram. The system will then move on to calculate an estimated value the process variable function value at the specific variable value. Following completion of the estimation, the system returns to calculation state 80 where it continues to calculate the detailed value of the process variable function (f(x)) and the derivative of the process variable function $$\left( \frac{d}{dx} f(x) \right).$$

As illustrated, the system can then accomplish process variable updates at a desired frequency while also fully utilizing its processor time to perform detailed calculations "in the background".

Figure 4:
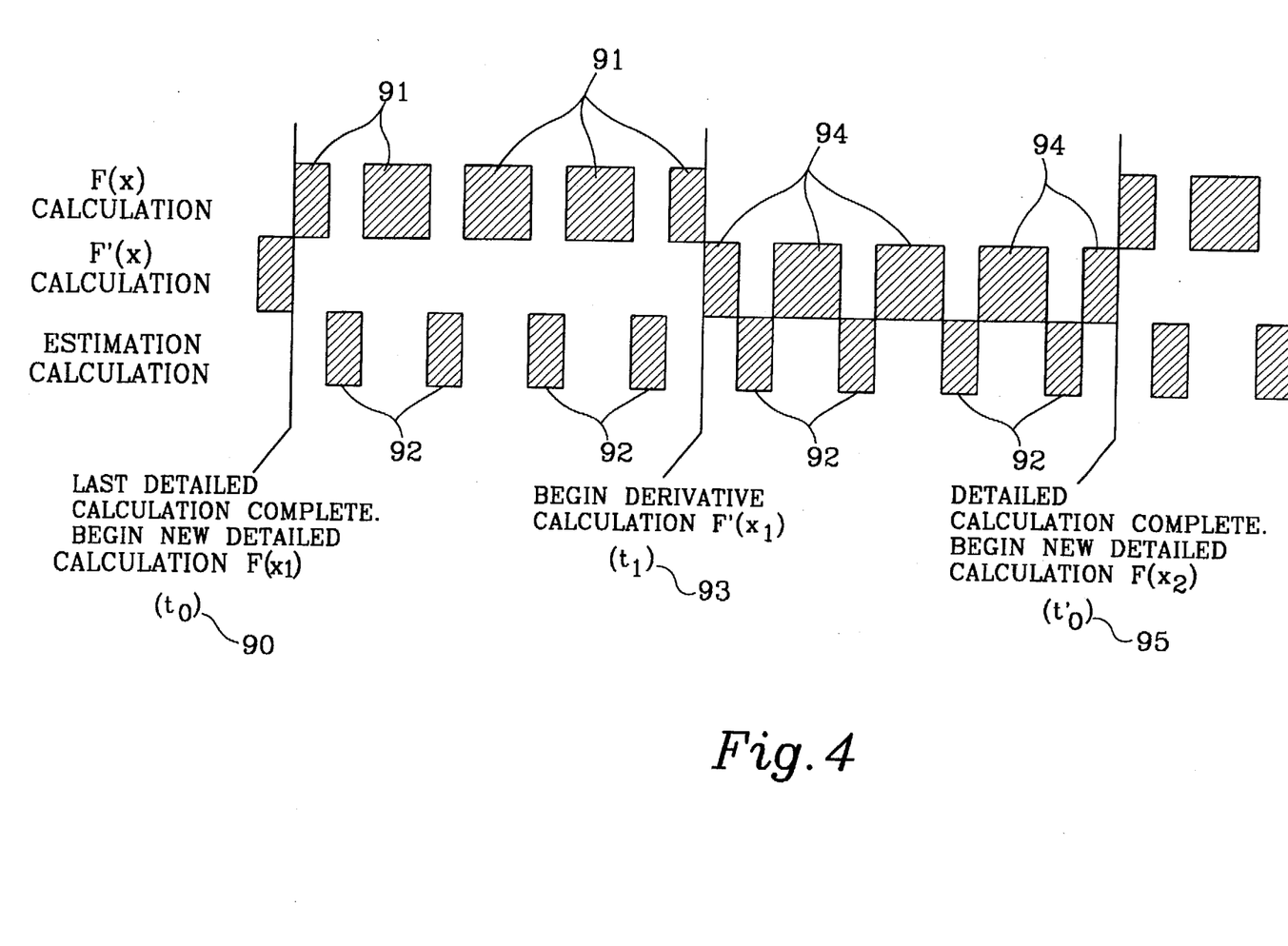
FIG. 4 is a timing diagram illustrating the update timing of the present invention carried out by an example processor.

Referring now to FIG. 4, there is shown a timing diagram which illustrates the timing of the method carried out by processor 60. It will be understood that this timing diagram illustrates the continual operation of the system; however, during an initial period the process variable function (f(x)) must be solved for an initial process variable ($x_0$) and the derivative of the process variable function $$\left( \frac{d}{dx} f(x) \right)$$

must also be determined for the initial variable ($x_0$) (i.e. values of $f(x_0)$ and $$\frac{d}{dx} f(x_0)).$$

Once initially solved, these values can then be used to accomplish the desired estimates using the method of the present invention.

Referring specifically to FIG. 4, at time $t_0$ 90, the cycle is begun in which the detailed calculation of the process variable function f(x) is begun utilizing the most recent variable values. At numerous times during the detailed calculation, the system is interrupted to produce an estimate calculation 92. During these estimates the process variable calculation 91 is interrupted and the processor can quickly and easily calculate an estimate using the approximation function listed above in equation 2. Once the estimate is calculated and produced, the system will move back to its process of calculating process variable function 91.

Following some period of time, the system will reach a point in which the detailed process variable function (f(x)) is solved, at which time the process begins to solve the derivative of the process variable function at that same variable value. This is shown in the timing diagram of FIG. 4 at time $t_1$ 93. Again, during the time period required to calculate the derivative of the process variable function $$\left( \frac{d}{dx} f(x) \right)$$

at the most recent variable value, numerous interrupts will be encountered 92 at which time the system is requested to produce a new estimation of the process variable value. At a second time, $t_0'$, the detailed calculations of both the process variable function (f(x)) and the derivative of the process variable function $$\left( \frac{d}{dx} f(x) \right)$$

are complete and the system will again begin producing a new detailed calculation of the process variable function using a new variable value.

It is further understood that at time $t_0$ the initial value of process variable function $f(x_0)$ and the derivative of the process variable function $$\frac{d}{dx} f(x_0)$$

are both known and therefore the estimation calculation can be easily carried out. At time $t_0'$ 95 shown on FIG. 4, the newly calculated values of f(x) and $$\frac{d}{dx} f(x)$$

are stored as $f(x_0)$ and $$\frac{d}{dx} f(x_0)$$

for use in producing estimated calculations. In this way the initial values are updated as quickly as they are calculated and will be used as initial values by the estimation function until new detailed calculations are completed. This process continually repeats to achieve both accuracy and the desired fast update rates.

Figure 5:
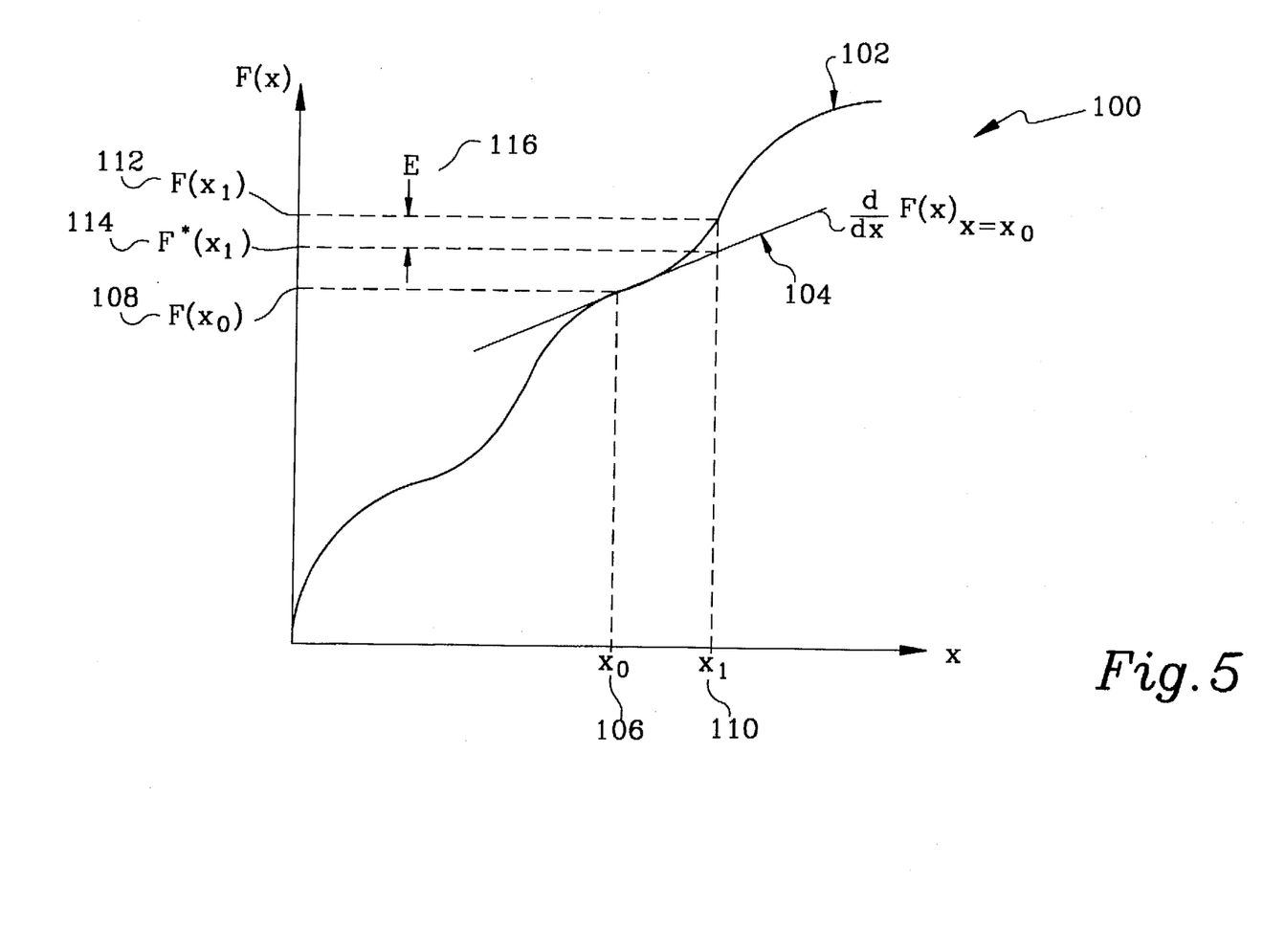
FIG. 5 is a graphical illustration showing one example application of the present invention.

FIG. 5 graphically illustrates the concept of the present invention and the trade-offs regarding accuracy and speed. As previously mentioned, the approximation theory utilized to provide high speed updates does sacrifice accuracy under dynamic conditions. However, as a completely accurate process variable is somewhat frequently recalculated, the method of the present invention appropriately readjusts to provide the desired accuracy.

Referring now to FIG. 5, there is shown a graph 100 illustrating the concept of the present invention and the trade-offs related thereto. In the example found in FIG. 4, the characterization equation is simplified to be dependent upon only one variable for illustrative purposes. However, it is understood that the same concepts are applicable to much more complicated functions. Shown in graphical form is the process variable function f(x) 102. At variable value $x_0$ 106, the characterization functions will have some initial process variable value $f(x_0)$ 108. Also calculated at this point is the first derivative of the function f(x) at $$x = x_{00} \left( \frac{d}{dx} f(x)_{x=0} \right).$$

This first derivative is shown as line 104 on FIG. 4.

When it is necessary to update the process variable, a new sensor value will be read ($x_1$) 110. The process variable value ($f(x_1)$) 112 can be calculated using the process variable function at this point. However, as previously mentioned, this is very time consuming. Therefore, it is faster and less complicated to approximate the process variable value at $x_1$ using the above mentioned approximation equation. Using this equation, an approximation for the process variable $f^*(x_1)$ 114 can be determined. Using an example function $f(x)$ 102 as shown in FIG. 4, the value for both $f(x_1)$ 112 and $f^*(x_1)$ 114 are shown. From this Figure it is clear that some error (E) 116 does exist. However, this error is typically small and will be corrected for when the full calculation is once again carried out. Furthermore, so long as the function's second derivative is small and the variable x does not change greatly, this error is greatly minimized. Furthermore, this minimal error can be tolerated in light of the increase in processor update.

The present invention has been described in considerable detail and in the context of a preferred embodiment. It is understood by those skilled in the art that changes can be made to the invention without departing from the principles thereof. We claim all inventions coming within the scope and spirit of the following claims.

What is claimed:

1. A measurement instrument having a fast update rate for measuring a process variable and communicating a signal indicative of that process variable to a control system, the measurement instrument comprising:

a process variable sensor for measuring the process variable, wherein the process variable sensor produces a process variable sensor output which is dependent upon the process variable being measured;

a second sensor for measuring an operating condition wherein the operating condition effects the operation of the process variable sensor, the second sensor for producing a second sensor output indicative of the operating condition;

a processing system attached to the process variable sensor output for receiving the process variable sensor output and the processing system further attached to the second sensor for receiving the second sensor output, the processing system for processing the process variable sensor output and the second sensor output according to a process variable function, wherein the sensor correcting system produces a detailed process variable output indicative of the process variable being measured by calculating the process variable function using the process variable sensor output and the second sensor output, the processing system further producing a high speed measurement instrument update signal which is also indicative of the process variable, the high speed measurement instrument update signal being calculated using an approximation equation, wherein the high speed measurement instrument update signal is calculated at a first frequency and the detailed process variable output is calculated at a second frequency, the second frequency being much lower than the first frequency.

2. The measurement instrument of claim 1 wherein the approximation equation is:

$$f_{update}(x) = f(x_0) + (x_1 - x_0) * \frac{d}{dx} f(x)_{x=0}$$

wherein x is representative of the process variable output and the process variable sensor output, f(x) is the process variable function and f($x_0$) is the initial process variable value.

3. The measurement instrument of claim 1 wherein the first frequency is 2 hertz and the second frequency is 0.1 hertz.

4. The measurement instrument of claim 1 wherein the second sensor is a temperature sensor.

5. The measurement instrument of claim 1 wherein the process variable sensor is a differential pressure sensor.

6. The measurement instrument of claim 1 wherein the process variable sensor is a static pressure sensor.

7. The measurement instrument of claim 1 wherein the detailed process variable output is updated from an initial corrected output by first calculating the derivative of the process variable function and then multiplying the derivative of the process variable function with the change in the uncorrected process variable measured by the process variable sensor, and adding this quantity to the initial corrected detailed process variable output.

8. The measurement instrument of claim 1 wherein the update is equal to the first two terms of a Taylor series of the process variable function.

9. A method for increasing the update rates of a process variable output by a measurement instrument, the measurement instrument communicating a signal indicative of the process variable to a control system and the measurement instrument including at least a first sensor for measuring the process variable and a second sensor for measuring an operating condition that affects the operation of the first sensor and a processing system for correcting the output of the first and second sensors, the method comprising the steps of:

measuring the value of the process variable by reading the output of the first sensor;

measuring the value of the operating conditions by reading the output of the second sensor;

transferring the value of process variable and the value of the operating conditions to the processing system;

calculating a detailed process variable output indicative of the process variable being measured in accordance to a process variable function, by using the first sensor output and the second sensor output; and, calculating a high speed measurement instrument update signal using an approximation equation indicative of the process variable, the high speed measurement instrument update signal is calculated at a first frequency and the detailed process variable output is calculated at a second frequency, the second frequency being much lower than the first frequency.

10. The method of claim 9 wherein the approximation equation includes a first term and a second term of a Taylor series representation of the process variable function.

11. The method of claim 10 wherein the first term is equal to the initial value and the second term is equal to the derivative of the first and second process variable function multiplied by the change in the sensor output.

12. The method of claim 9 wherein the approximation equation is:

$$f_{update}(x) = f(x_0) + (x_1 - x_0) * \frac{d}{dx} f(x)_{x=x_0}$$

wherein x is representative of the process variable output and the process variable sensor output, f(x) is the process variable function, and $f(x_0)$ is the process variable initial value.

13. The method of claim 9 wherein the first frequency is 2 hertz and the second frequency is 0.1 hertz.

14. The method of claim 9 wherein the second sensor is a temperature sensor.

15. The method of claim 9 wherein the process variable sensor is a differential pressure sensor.

16. The method of claim 9 wherein the process variable sensor is a static pressure sensor.

* * * * *